(12) United States Patent
Röhm

(10) Patent No.: US 6,883,809 B2
(45) Date of Patent: Apr. 26, 2005

(54) DRILL CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 177 days.

(21) Appl. No.: 10/224,162

(22) Filed: Aug. 20, 2002

(65) Prior Publication Data

US 2003/0230861 A1 Dec. 18, 2003

(30) Foreign Application Priority Data

Jun. 12, 2002 (DE) .......................................... 102 26 165

(51) Int. Cl.$^7$ ............................................. B23B 31/12
(52) U.S. Cl. ....................................... 279/62; 279/157
(58) Field of Search ............................. 279/60, 61, 62, 279/63, 64, 157

(56) References Cited

U.S. PATENT DOCUMENTS 5,765,839 A 6/1998 Rohm
6,341,783 B1 * 1/2002 Rohm .......................... 279/62
6,659,474 B2 * 12/2003 Sakamaki et al. ............ 279/62

FOREIGN PATENT DOCUMENTS

DE 19907331 A1 * 8/2000 ........... B23B/31/10

* cited by examiner

Primary Examiner—Daniel W. Howell
(74) Attorney, Agent, or Firm—Herbert Dubno; Andrew Wilford

(57) ABSTRACT

A drill chuck has according to the invention a chuck body centered on and rotatable about an axis and having a rear end formed with an axially forwardly facing shoulder, a plurality of jaws radially displaceable in the body between a closely spaced tool-gripping position and a widely spaced tool-releasing position, and a tightening sleeve rotatable about the axis on the body and coupled to the jaws for displacing them between their positions on rotation of the sleeve on the body. An annular closure disk has an inner periphery formed with a radially deflectable part engaged axially rearwardly with the shoulder and locking the disk on the body.

11 Claims, 2 Drawing Sheets

DRILL CHUCK

FIELD OF THE INVENTION

The present invention relates to a drill chuck. More particularly this invention concerns a drill chuck for a hammer drill.

BACKGROUND OF THE INVENTION

A standard drill chuck such as described in U.S. Pat. No. 5,765,839 has a chuck body rotatable about a chuck axis and provided centered on the axis with an annular array of teeth each having a steep flank and a shallow flank and a plurality of jaws angularly spaced on the body about the axis and radially displaceable relative to the body between inner and outer positions. A tightening ring is axially fixed but rotatable about the axis on the body in a tightening direction and in an opposite loosening direction and a pair of screwthread formations between the tightening ring and the jaws move the jaws radially together on rotation of the tightening ring in the tightening direction and radially apart on rotation of the tightening ring in the loosening direction. A locking member engageable with the teeth and angularly fixed on the tightening ring is radially displaceable between a locking position engaging the teeth and preventing rotation of the body relative to the tightening ring in the loosening direction and a freeing position permitting free rotation of the body relative to the tightening ring in both directions. A sleeve axially fixed but angularly displaceable on the tightening ring is formed with a pair of angularly spaced and radially open seats. A pair of angularly spaced abutments between the sleeve and the tightening ring limit angular movement of the sleeve on the tightening ring to movement between a pair of end positions of the sleeve on the tightening ring. A cam on the sleeve is engageable with the locking member for displacing the locking member into the locking position when the sleeve is in one of its end positions and for displacing the locking member into the freeing position when the sleeve is in the other of its end positions. A latch member angularly fixed on the tightening ring is engageable in the seats of the sleeve for releasably retaining the sleeve in its end positions. A common spring extending angularly along and fixed angularly in the tightening ring urges the latch member into the seats and the locking member into the freeing position.

With this system the sleeve serves both to position the locking member and to rotate the ring. When tightening the chuck, the sleeve merely rotates the tightening ring with the locking member ratcheting or sliding over the shallow backs of the sawteeth of the chuck body. When loosening, the sleeve at first rotates relative to the tightening ring to pull the locking member out of engagement with the teeth and subsequent backward rotation of the sleeve entrains the locking ring and opens the chuck. Thus the sleeve can in fact constitute the entire outside surface of the chuck, making it extremely simple to handle. The locking feature of the chuck is automatic, that is the chuck is automatically locked when tightened and automatically unlocked when loosened.

The advantage of this system is that rotation in the tightening direction tightens the jaws on the tool and, once they are solidly engaged with the tool, locks the chuck. Opposite rotation when the chuck is clamped on a tool first unlocks the chuck and then spreads the jaws to release the tool.

In order to hold the chuck body still during the tightening/locking rotation and the unlocking/loosening rotation, it is standard to provide a holding ring or the like fixed on the chuck body and exposed adjacent the tightening ring or sleeve so that the user can grip the holding ring with one hand and the tightening ring with the other to relatively rotate them. In other systems a spindle lock is provided on the drill which allows the chuck body to be arrested. In such arrangements the holding ring is, therefore, superfluous.

OBJECTS OF THE INVENTION

It is therefore an object of the present invention to provide an improved drill chuck.

Another object is the provision of such an improved drill chuck which overcomes the above-given disadvantages, that is which is of simple and inexpensive construction, yet which is as easy to use and durable as the above-described type of chuck.

SUMMARY OF THE INVENTION

A drill chuck has according to the invention a chuck body centered on and rotatable about an axis and having a rear end formed with an axially forwardly facing shoulder, a plurality of jaws radially displaceable in the body between a closely spaced tool-gripping position and a widely spaced tool-releasing position, and a tightening sleeve rotatable about the axis on the body and coupled to the jaws for displacing them between their positions on rotation of the sleeve on the body. According to the invention an annular closure disk has an inner periphery formed with a radially deflectable part engaged axially rearwardly with the shoulder and locking the disk on the body.

With this arrangement the closure disk can be snapped onto the rear end of the chuck body, making assembly of the chuck simple and inexpensive. Once installed, the disk is very solidly mounted and can be counted on to stay in place, rearwardly closing the gap between the chuck body and the tightening sleeve or ring.

In accordance with the invention the part is an elastically deflectable lip unitarily formed with the disk and the disk is formed with an annular rearwardly open groove forming the lip. Such construction is extremely inexpensive yet very durable.

More particularly according to the invention the body is formed with a radially outwardly open groove having a rear flank forming the shoulder and the groove has an axial dimension at least equal to an axial dimension of the part. The disk is rotatable about the axis on the body with sliding of the part on the shoulder.

In addition according to the invention the disk is formed with at least one axially throughgoing hole. Thus particles that work their way back in the chuck, for instance when drilling overhead, can drain out of the chuck.

In order to ensure centered rotation of the tightening sleeve the disk has an outer periphery formed centered on the axis with a forwardly projecting skirt. It can interfit, for instance with an annular axially forwardly projecting lip, with the sleeve to guide and center it. It can even extend forward and actually form the tightening sleeve.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
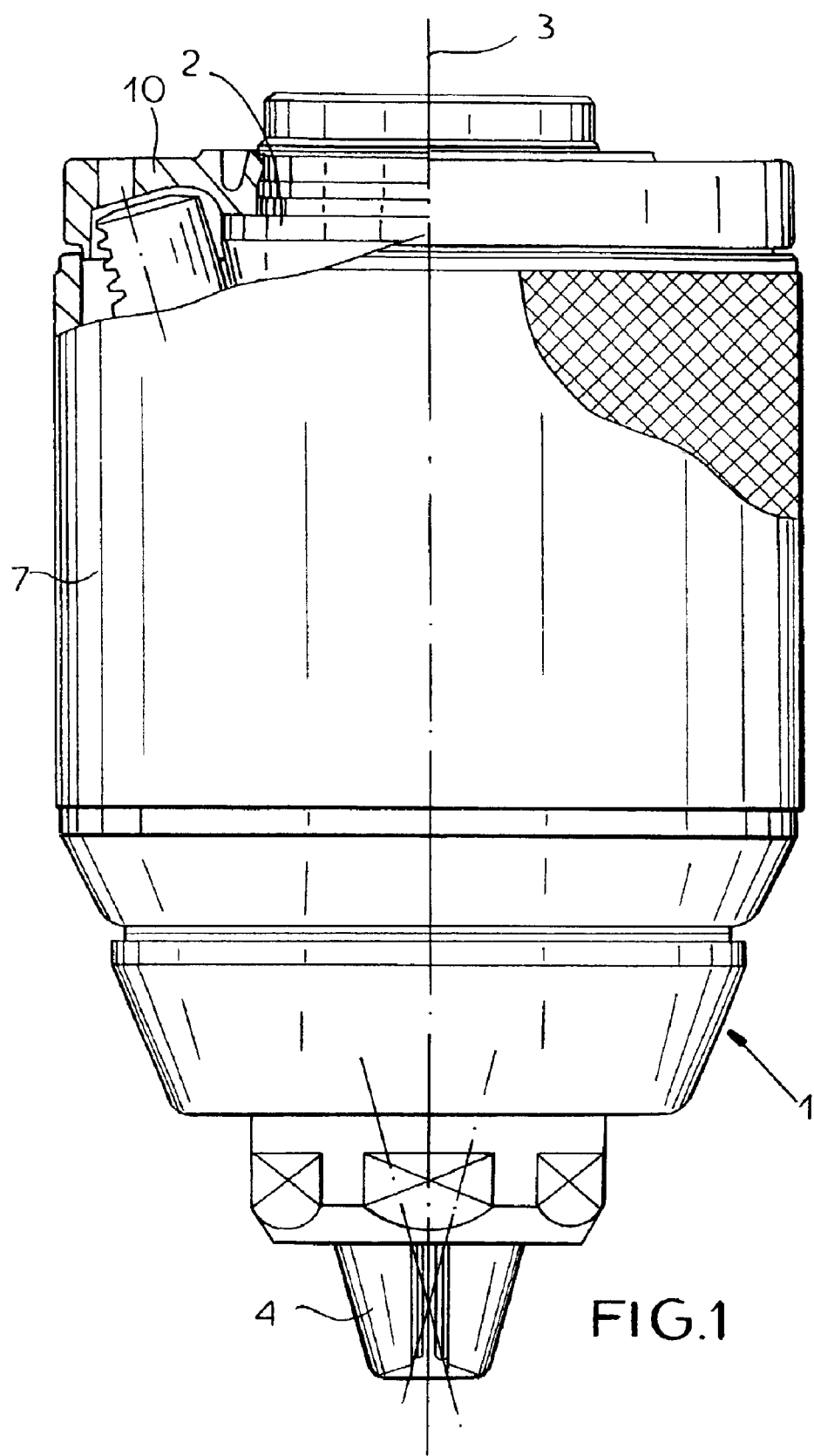
FIG. 1 is a partly sectional side view of the chuck according to the invention.
Figure 2:
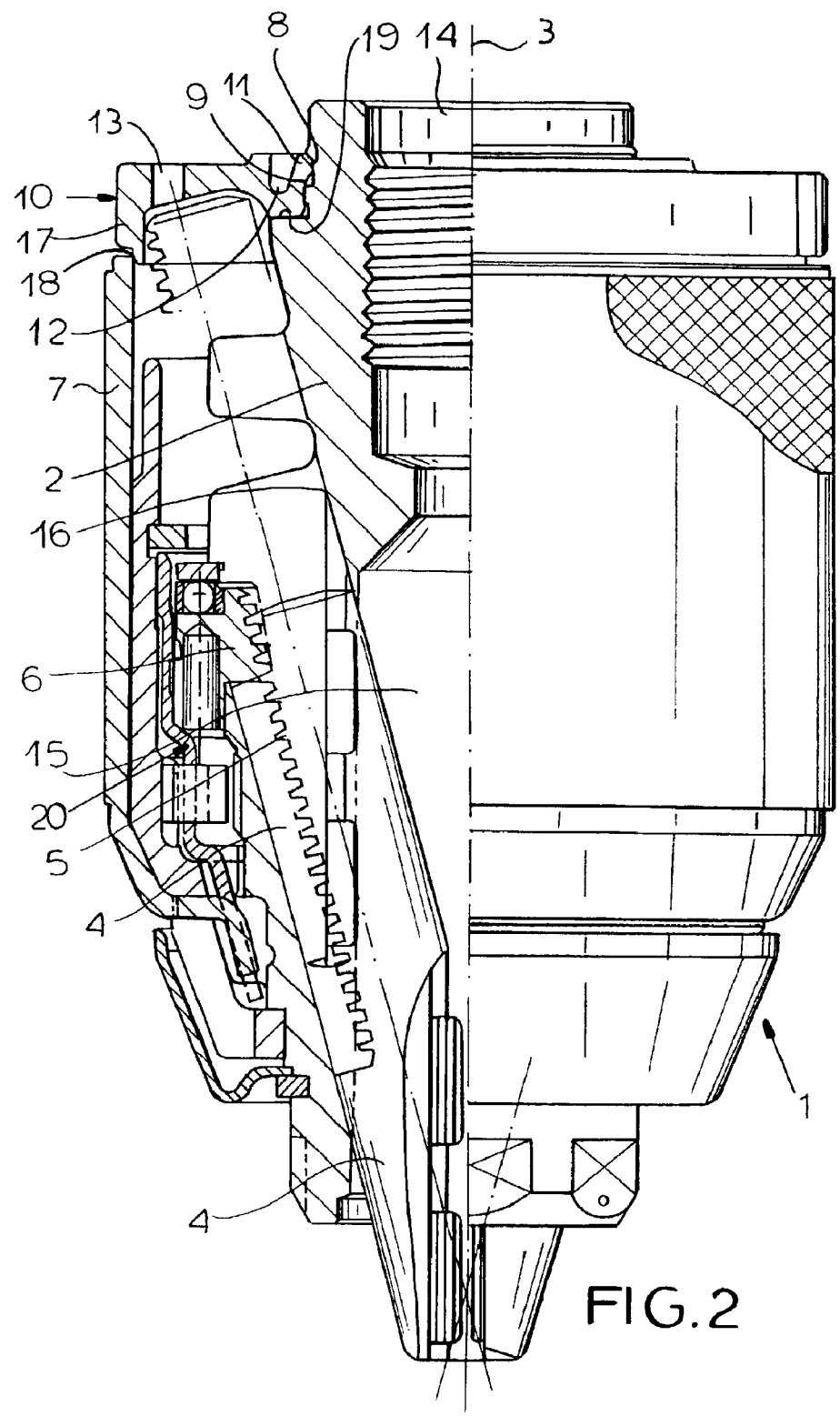
FIG. 2 is a view like FIG. 1 of the chuck.

As seen in FIGS. 1 and 2 a drill chuck 1 according to the invention has a body 2 centered on and rotatable about an axis 3 and formed with a rearwardly open threaded spindle bore 14, a forwardly open tool recess or seat 15, and a three angled guide passages 16. A jaw 4 in each of the passages 16 has an outer edge formed with a row of teeth 5 meshing with an internal screwthread of a tightening ring 6 that is rotatable about the axis 3 on the body 2 but not axially movable thereon so that rotation of the ring 6 in one direction moves the jaws 4 axially forward (down in the drawing) and radially together and opposite rotation moves them axially backward and radially apart.

The ring 6 is fixed via standard mechanism 20 described in more detail in above-cited U.S. Pat. No. 5,765,839 with a generally cylindrical tightening sleeve 7 extending substantially the full length of the chuck body 2 and having a milled outer surface so that it can be rotated by hand, that is without the aid of a chuck key. The chuck body 2 itself is intended for mounting on an unillustrated threaded drill spindle provided with a spindle lock so that it can be locked against rotation during tightening and loosening of the chuck 1.

According to the invention the rear end of the chuck 1 is closed by an annular closure disk 10 having on its outer periphery a cylindrical forwardly directed skirt 17 with a lip 18 extending into the rear end of the sleeve 9 and formed with at least one axially throughgoing hole 13 so chips and the like can pass out of the chuck 1, for instance when drilling overhead. This disk 10 rests against a planar rearwardly directed shoulder 19 and is formed with an elastically deformable inwardly projecting part or lip 11 engaged in a radially outwardly open groove 9 formed in the body 2 and having an axially forwardly directed rear flank 8 bearing axially forwardly against the part 11. An axially rearwardly open circular groove 12 defines the lip or part 11 and allows it to be deflected elastically outward when the disk 10 is fitted to the body 2 by being forced axially forward over its rear end. Thus the disk 10 is snap fitted to the body 2 but, once installed, is very solidly mounted thereon to permanently close the rear end of the chuck 1.

I claim:

1. A drill chuck comprising:

a chuck body centered on and rotatable about an axis and having a rear end formed with an axially forwardly facing shoulder;

a plurality of jaws radially displaceable in the body between a closely spaced tool-gripping position and a widely spaced tool-releasing position;

a tightening sleeve rotatable about the axis on the body;

mechanism coupling the sleeve to the jaws for displacing the jaws between their positions on rotation of the sleeve on the body; and an annular closure disk having an inner periphery formed with a radially elastically deflectable part engaged axially rearwardly with the shoulder and locking the disk on the body.

2. The drill chuck defined in claim 1 wherein the part is an axially projecting and elastically deflectable lip unitarily formed with the disk.

3. The drill chuck defined in claim 1 wherein the body is formed with a radially outwardly open groove having a rear flank forming the shoulder.

4. The drill chuck defined in claim 3 wherein the groove has an axial dimension at least equal to an axial dimension of the part.

5. The drill chuck defined in claim 1 wherein the disk is rotatable about the axis on the body with sliding of the part on the shoulder.

6. The drill chuck defined in claim 1 wherein the disk is formed with at least one axially throughgoing hole.

7. The drill chuck defined in claim 1 wherein the disk has an outer periphery formed centered on the axis with a forwardly projecting skirt.

8. The drill chuck defined in claim 2 wherein the disk is formed with an axially rearwardly open groove defining the lip.

9. A drill chuck comprising:

a chuck body centered on and rotatable about an axis and having a rear end formed with an axially forwardly facing shoulder;

a plurality of jaws radially displaceable in the body between a closely spaced tool-gripping position and a widely spaced tool-releasing position;

a tightening sleeve rotatable about the axis on the body;

mechanism coupling the sleeve to the jaws for displacing the jaws between their positions on rotation of the sleeve on the body; and an annular and generally planar closure disk closing a rear end of the sleeve and having an inner periphery formed with a radially elastically deflectable and axially extending annular lip engaged axially rearwardly with the shoulder and locking the disk on the body.

10. The drill chuck defined in claim 9 wherein the lip extends axially rearward from and is unitarily formed with the closure disk.

11. The drill chuck defined in claim 10 wherein the chuck body has an axially rearwardly directed shoulder on which the closure disk bears axially forwardly.

* * * * *